(12) United States Patent
Tarbotton et al.

(10) Patent No.: US 7,281,267 B2
(45) Date of Patent: Oct. 9, 2007

(54) SOFTWARE AUDIT SYSTEM

(75) Inventors: Lee Codel Lawson Tarbotton, Leicester (GB); Daniel Joseph Wolff, Aylesbury (GB); Timothy James Page, Milton Keynes (GB)

(73) Assignee: McAfee, Inc., Santa Clara, CA (US)

( * ) Notice: Subject to any disclaimer, the term of this patent is extended or adjusted under 35 U.S.C. 154(b) by 892 days.

(21) Appl. No.: 09/785,222

(22) Filed: Feb. 20, 2001

(65) Prior Publication Data

US 2002/0116627 A1    Aug. 22, 2002

(51) Int. Cl.
*G06F 11/00* (2006.01)
*G06F 17/00* (2006.01)
*G06F 11/30* (2006.01)
*G06F 12/14* (2006.01)
*H04K 1/00* (2006.01)
*H04L 9/00* (2006.01)
*H04L 9/32* (2006.01)
*G06Q 99/00* (2006.01)

(52) U.S. Cl. .............. 726/22; 726/1; 726/2; 726/3; 726/4; 713/187; 713/188; 713/193; 713/194; 380/229; 380/230; 380/231; 380/232; 705/50; 705/51; 705/52; 705/53; 705/54; 705/55; 705/56; 705/57

(58) Field of Classification Search ........ 713/187–188, 713/200, 193–194; 714/38; 380/229–233; 705/50–59; 726/1–7, 24–30
See application file for complete search history.

(56) References Cited

U.S. PATENT DOCUMENTS

| | | | | |
|---|---|---|---|---|
| 5,398,196 A * | 3/1995 | Chambers | .................... | 714/28 |
| 5,671,412 A * | 9/1997 | Christiano | ............... | 707/104.1 |
| 6,006,329 A * | 12/1999 | Chi | ........................... | 713/200 |
| 6,009,518 A * | 12/1999 | Shiakallis | ..................... | 713/1 |
| 6,029,256 A * | 2/2000 | Kouznetsov | ................. | 714/38 |
| 6,415,280 B1 * | 7/2002 | Farber et al. | .................. | 707/2 |
| 6,577,920 B1 * | 6/2003 | Hypponen et al. | .......... | 700/200 |
| 6,721,721 B1 * | 4/2004 | Bates et al. | .................... | 707/1 |
| 6,735,700 B1 * | 5/2004 | Flint et al. | ................... | 713/200 |
| 2002/0078203 A1 * | 6/2002 | Greschler et al. | .......... | 709/225 |

* cited by examiner

*Primary Examiner*—Ayaz Sheikh
*Assistant Examiner*—Longbit Chai
(74) *Attorney, Agent, or Firm*—Zilka-Kotab, PC; Christopher J. Hamaty

(57) ABSTRACT

A software audit system is provided in conjunction with an anti-virus system. A computer virus scan request received by the anti-virus system (16) is used to trigger an audit data generator (18) to generate audit data. The audit data generator (18) may also serve to ban certain computer programs from execution and monitor the concurrent usage of other computer programs.

46 Claims, 6 Drawing Sheets

SOFTWARE AUDIT SYSTEM

BACKGROUND OF THE INVENTION

1. Field of the Invention

This invention relates to the field of data processing systems. More particularly, this invention relates to the field of software auditing within data processing systems.

2. Description of the Prior Art

As computer networks within companies and organisations become more extensive and more complex, there is a considerable growth in the number of software programs that are installed and used on the computer systems. In order to increase the reliability and efficiency of computer systems, it is often significant to have a clear understanding and control of what computer programs are being used. As an example, different users employing different versions of a program may cause compatibility problems. There may also be problems due to people installing unauthorised, or illegally copied, computer programs on their computer systems.

It is known to provide software auditing tools that can provide audit data either locally or back to a central network manager regarding the computer programs installed and used on a computer system. While these systems are useful in addressing the above mentioned problems, they have the disadvantage of themselves representing an additional computer program that must be installed and maintained within the computer systems as well as consuming potentially significant processing resources of the computer systems concerned.

SUMMARY OF THE INVENTION

Viewed from one aspect, the present invention provides a computer program product comprising a computer program operable to control a computer to generate audit data indicative of a request to execute a computer program, said computer program comprising:

(i) computer virus scanner logic operable to receive a computer virus scan request, said computer virus scan request including data identifying a computer file to be scanned for computer viruses; and (ii) audit data generator logic triggered by said computer virus scanner logic, and responsive to said data identifying said computer file to be scanned, to identify a request to execute a computer program and, in response to identification of said request to execute said computer program, to generate audit data identifying said computer program.

The invention recognises that as a consequence of the increasing threat from computer viruses and other malicious programs, it is increasingly common for anti-virus computer programs to be permanently installed and active on computer systems. The threat from computer viruses and malicious programs is sufficiently severe that the overhead in supporting these counter-measures is more than justified. Anti-virus computer programs typically require relatively low level access and control within a computer system in order to properly protect it from computer virus threats. An anti-virus computer program can receive scan requests on an on-access or an on-demand basis. These scan requests will include data identifying the computer file in question so that it may be scanned before being used. The invention exploits the fact that the information being passed to the anti-virus computer program can readily also be used to provide audit data regarding the computer programs in use on a computer system. This audit data can be viewed as a by-product of the anti-virus computer program that may be provided with advantageously little additional overhead. The audit data generator effectively rides on the back of the anti-virus computer program in a manner that is able to provide comprehensive, secure and accurate audit data whilst consuming relatively little additional processing overhead and without requiring the installation and support of a stand-alone audit system.

It will be appreciated that whilst the computer virus scan requests could originate in various different ways, a particularly secure and effective manner of triggering scans is when a file access request to an operating system is intercepted and triggers a computer virus scan request.

As well as generating audit data indicating which computer programs are installed and being used, the system of the present invention may also be utilised to enforce the banning of certain computer programs from execution. Many organisations have policies prohibiting the use of their computer systems for running games, copyright-infringing programs or other undesirable and unauthorised computer programs. Such banned computer programs wastefully consume computer system resources as well as potentially leading to security problems through the introduction of computer viruses or unreliability in the computer systems. The low level and secure nature of anti-virus computer programs has the result that the audit data generator is able to obtain low level access to a comprehensive list of the computer files being use and accordingly it is difficult for a user to disguise the use of a banned program or try to circumvent the measures taken to enforce the banning of that computer program.

When a banned computer program is detected, various automatic measures may be triggered. The banned computer program may be deleted, disabled, encrypted and replaced by a stub program, or merely an alert issued to the user and a system administrator or manager. In highly-secure environments, the banned computer program functionality may be extended to treat all computer programs not within a permitted computer program list as banned computer programs. Thus, only computer programs that have been specifically approved for use may be executed.

The audit data generator may also be advantageously used to monitor concurrent usage of a particular computer program.

It is relatively common practice for certain computer programs to be licensed on the basis of a maximum of concurrent users being permitted. The audit data generator provides a relatively low overhead mechanism for monitoring compliance with such arrangements.

As well as monitoring compliance with such an arrangement, the concurrent usage logic may additionally deny requests to execute a computer program if the maximum permitted number would be exceeded by granting such a request. This action would also advantageously be accompanied by display of a user message so that the user understood what was taking place.

The concurrent usage logic may be applied in more a more sophisticated way with the predetermined number of concurrent users being controlled to vary with time and possibly at some times being set to be zero. In this way, processing resources may be balanced and certain resource-intensive operations restricted during critical times.

In order to reduce the likelihood of the audit system being circumvented by the renaming of computer files, preferred embodiments serve to calculate a checksum value from a computer file being subject to audit, that checksum value being highly characteristic of a particular computer file irrespective of its name.

In order to reduce the additional overhead of calculating checksum values for computer files under investigation, preferred embodiments serve to cache checksum values and re-use these cached checksum values should a further access to the same computer be made without an intervening change having been made to that computer file.

In order to aid in the identification of particular software applications from the computer files that they access, the system may be provided with a non-user specified database of computer program identification data that can be used by the audit data generator logic to identify a computer program from the data passed to it by the anti-virus computer program. In addition to this vendor-supplied data, user-specified data may also be included to accommodate more specialised or in-house specific computer programs used in a particular circumstance.

In order to further reduce the processing overhead associated with the audit system, an individual computer on a network may serve to store its audit data locally until polled by a remote computer for that audit data. Thus, at a quiet time of day a central remote computer may poll network connected computers to gather all of the audit data for the preceding day at a time when this will not interfere with normal usage of the network. The central computer may then go on to produce a consolidated audit report for the network in question.

Viewed from another aspect, the invention provides a method of generating audit data indicative of a request to execute a computer program, said method comprising the steps of:

(i) receiving a computer virus scan request within a computer virus scanner, said computer virus scan request including data identifying a computer file to be scanned for computer viruses;

(ii) triggering operation of an audit data generator using said computer virus scanner, said audit data generator being responsive to said data identifying said computer file to be scanned to identify a request to execute a computer program; and (iii) in response to identification of said request to execute said computer program, generating audit data identifying said computer program.

Viewed from a further aspect, the invention provides apparatus for generating audit data indicative of a request to execute a computer program, said apparatus comprising:

(i) a computer virus scanner operable to receive a computer virus scan request, said computer virus scan request including data identifying a computer file to be scanned for computer viruses; and (ii) an audit data generator triggered by said computer virus scanner logic, and responsive to said data identifying said computer file to be scanned, to identify a request to execute a computer program and, in response to identification of said request to execute said computer program, to generate audit data identifying said computer program.

BRIEF DESCRIPTION OF THE DRAWINGS

The above, and other objects, features and advantages of this invention will be apparent from the following detailed description of illustrative embodiments which is to be read in connection with the accompanying drawings, in which.

DESCRIPTION OF THE PREFERRED EMBODIMENTS

Figure 1:
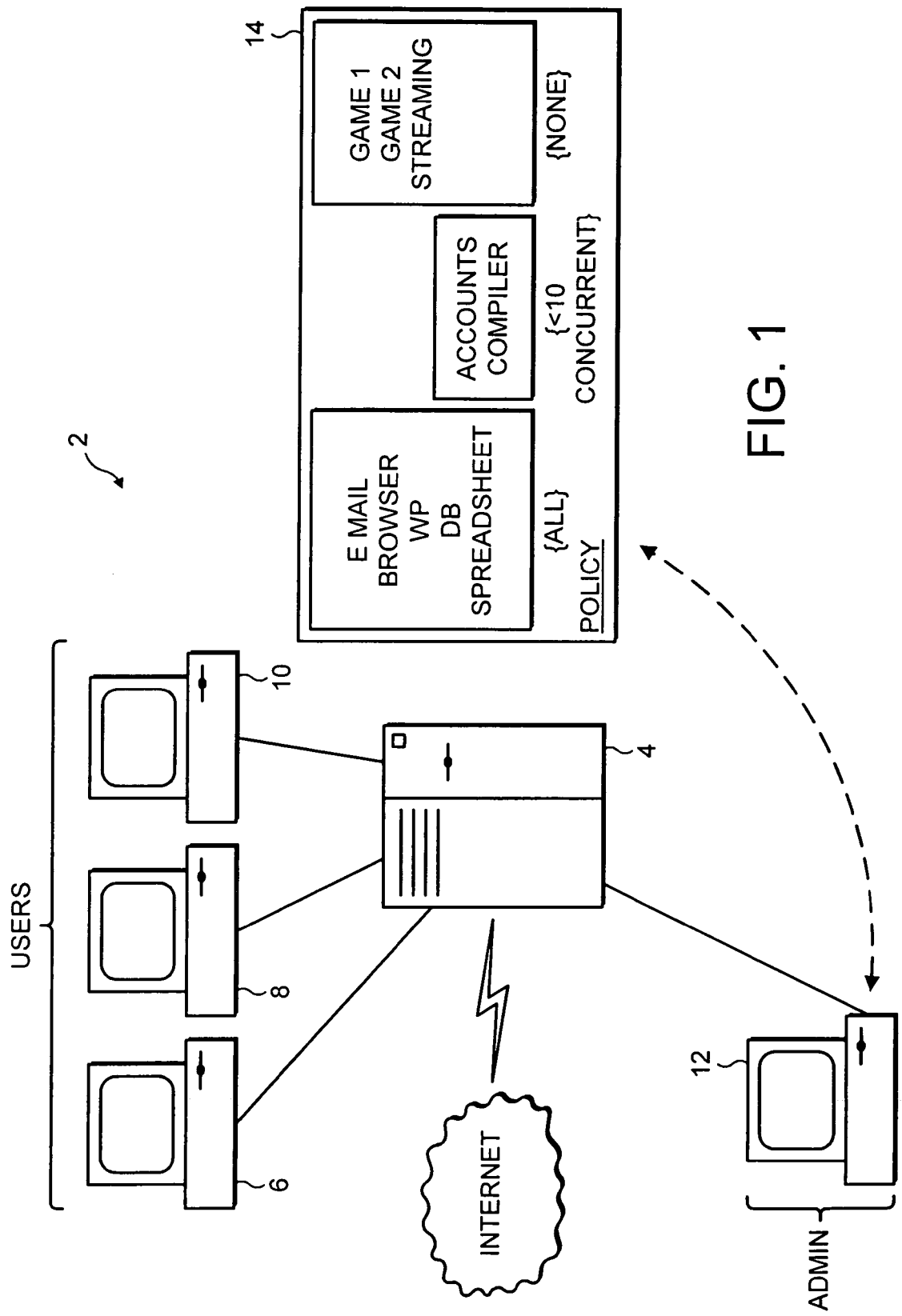
FIG. 1 schematically illustrates a computer network that may utilise the combined anti-virus and audit data generator system.

FIG. 1 schematically illustrates a computer network 2 of the type that may typically be found within many organisations and businesses. The computer network 2 comprises a central server computer 4 with many user computers 6, 8, 10 connected to the server computer 4. A system administrator uses a farther computer 12 to administer and control the network 2. The network 2 may also have a link the internet.

As is known, such a network 2 may employ anti-virus computer systems resident on the server 4 and each of the user and administrator computers 6, 8, 10, 12. Such anti-virus computer systems are strongly desirable in networks 2 that have a link to the internet as the internet is a common source of computer viruses and other malicious programs.

The network administrator establishes a policy 14 regarding what computer programs should be installed and used upon the network 2. A set of common computer programs, such as e-mail, browsers, word processors, databases and spreadsheets, will be provided on all of the computers 6, 8, 10, 12 and available to all users. Certain other computer programs that may typically be more specialised or high cost in nature are limited to less than a certain number of concurrent users. Still further computer programs will effectively be banned and will be specified as not available for use on any of the computers 6, 8, 10, 12 within the network 2. Examples of such banned computers programs may be certain computer games or internet data streaming programs that can consume excessive system resources. The system vendor produces data identifying many common computer programs, but tools are also provided to allow a user to generate data identifying their own programs.

Figure 2:
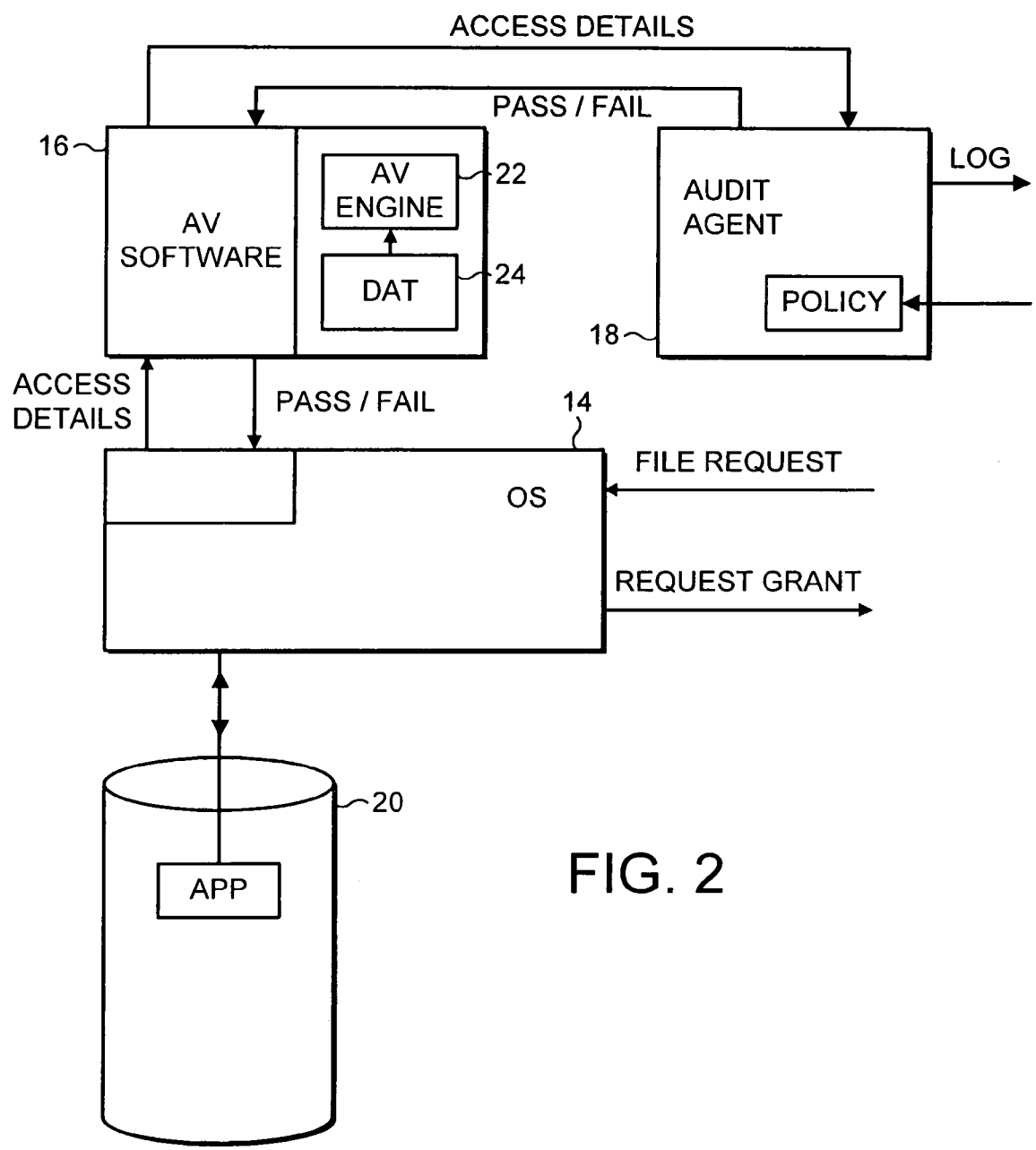
FIG. 2 schematically illustrates the relationship between the operating system, the anti-virus software and the audit data generator.

FIG. 2 schematically illustrates the relationship between the operating system 14, the anti-virus software 16 and the audit data generator 18. The operating system 14 receives file access requests to files stored on a hard disk drive 20 or stored elsewhere. In accordance with normal operating system operation, the operating system 14 will subsequently typically grant such a request should the request source have the appropriate permissions, etc.

Known anti-virus software systems tap into the operating system 14 and serve to intercept file access requests before they are serviced by the operating system. These intercepted file access requests are then passed to the anti-virus software 16 where they are checked to see if the computer file in question in infected with a computer virus or represents another type of malicious computer program. If the computer file in question is safe for use, the a pass signal is passed back to the operating system 14 by the anti-virus software 16 and the operating system 14 then continues to service the file access request in the normal way. The anti-virus software 16 uses an anti-virus engine 22 responsive to virus definition data 24 in order to check computer files for infection or malicious intent.

The access details supplied from the operating system 14 to the anti-virus software 16 typically include the file name of the computer file in question, the identification of the requester, the location where the computer file is stored, and various other information. This access details information may be used by the anti-virus software 16 in conducting its normal operation. This information also happens to be very well suited for the purposes of audit data generation. In the system illustrated, the anti-virus software 16 passes this information on to an audit data generator 18 which logs the identity of the computer program in question if the computer file being accessed relates to a known computer program. The audit data generator 18 may calculate a checksum value from the contents of the computer file in question as such checksum values are highly characteristic of particular files even if their file names are changed. Such a checksum value may be compared with a non-user specified list of characteristic checksum values or a user specified list of checksum values in order to identify a particular computer program. In order to reduce the overhead associated with the generation of such checksum values, the audit data generator 18 may use a local cache of recently calculated checksum values as well as monitoring whether a particular file has been changed since a checksum value was last calculated for it. If a checksum is required for a computer file for which that checksum has recently been calculated and is stored within cache and the access details information indicates that the file has not been modified since the checksum was calculated, then the cached checksum value may be used thereby saving processing resources.

The audit data generator 18 also is responsive to an externally supplied set of policy data indicating a list of banned computer programs, permitted computer programs or possibly information concerning concurrent usage requirements.

If the audit data generator 18 determines that there is no audit policy reason to prevent execution of a computer program or access to a particular computer file, then this is indicated by a pass signal sent back to the anti-virus software 16. The anti-virus software 16 waits until it receives this pass signal from the audit data generator 18 and its own anti-virus scanning has successfully completed before returning a consolidated pass/fail signal back to the operating system 14.

Figure 3:
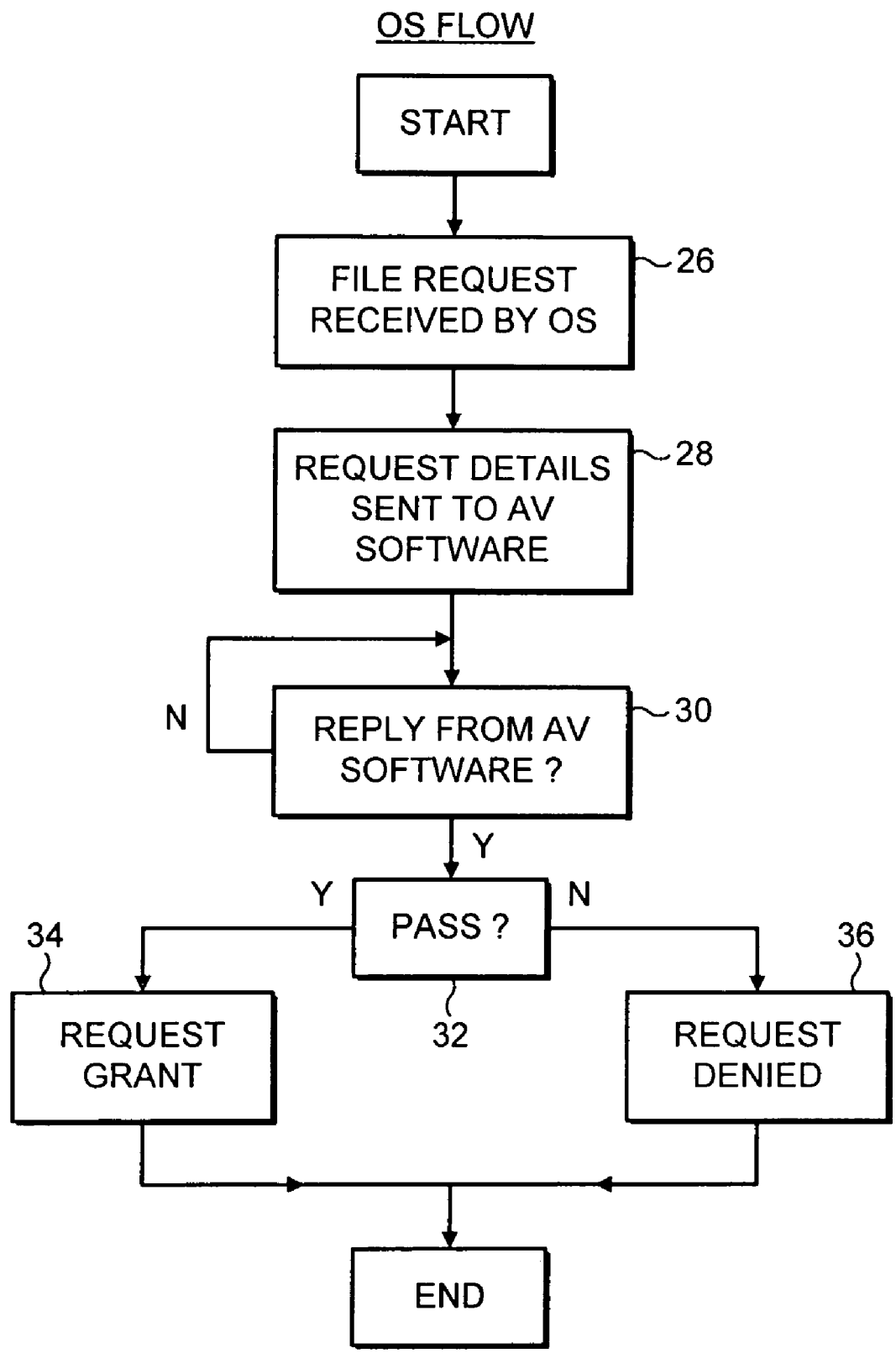
FIG. 3 is a flow diagram schematically illustrating the operation of the operating system.

FIG. 3 schematically illustrates the processing flow within the operating system. At step 26, the operating system 14 receives a file access request, such as is generated by an application program or a direct user command.

At step 28, this file access request is intercepted and sent on to the anti-virus software 16. At step 30, the operating system waits until a reply is received from the anti-virus software 16. When a reply is received, processing proceeds to step 32.

At step 32, a test is made as to whether or not the response from the anti-virus software 16 was a pass or a fail. If a pass was returned, then processing proceeds via step 34 at which the file access request is granted and normal operation of the operating system 14 continues. If the reply indicated a fail, then processing proceeds to step 36 at which the file access request is denied and an appropriate message displayed to the user or other action taken.

Figure 4:
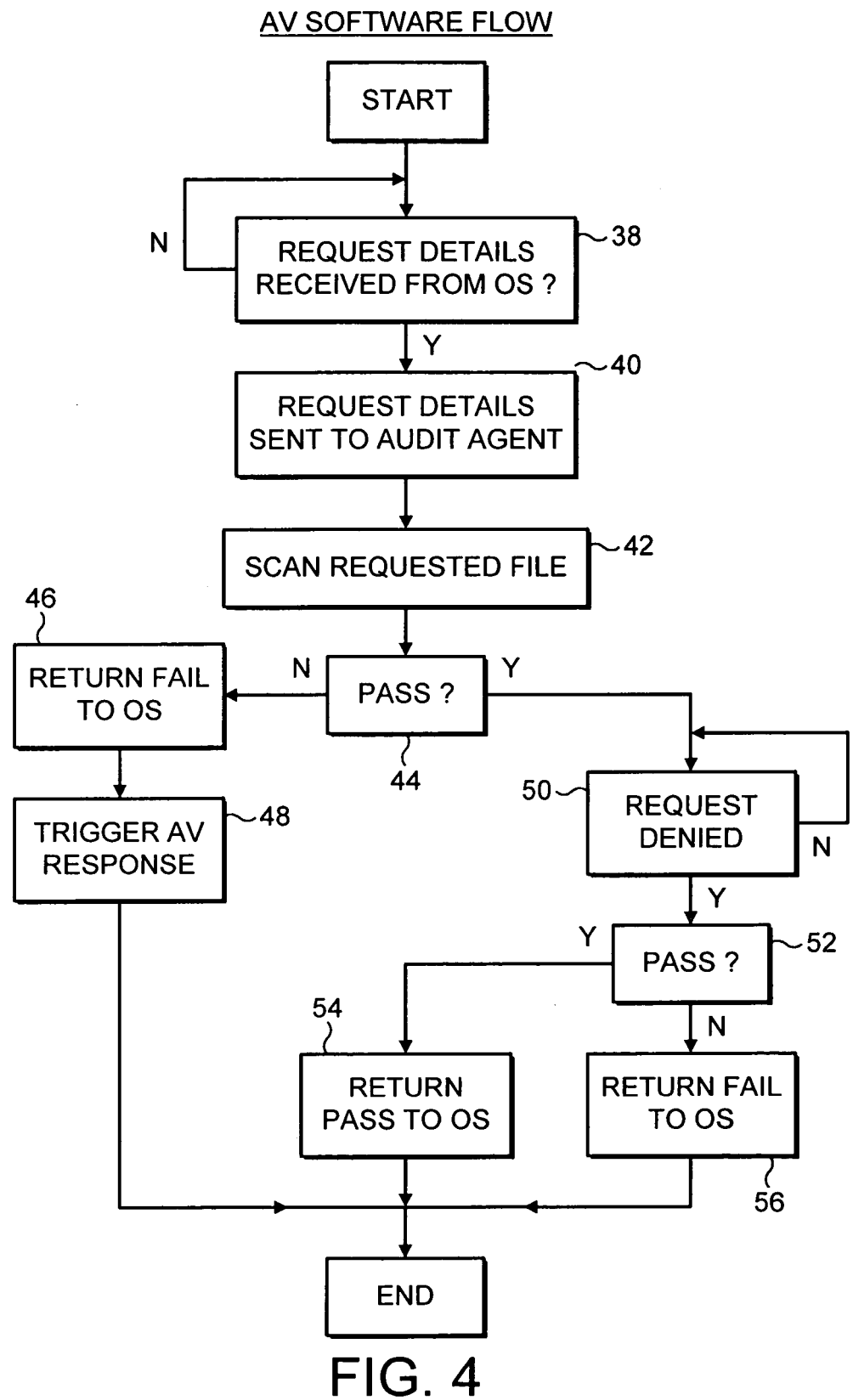
FIG. 4 is a flow diagram schematically illustrating the operation of the anti-virus software.

FIG. 4 is a flow diagram illustrating the operation of the anti-virus software 16.

At step 38, the anti-virus software 16 waits until it receives details of a computer file access request from the operating system 14. When such details are received, processing proceeds to step 40. At step 40, the details of the computer file access request are sent on to the audit data generator 18.

At step 42, the anti-virus scan using the anti-virus engine 22 and the virus definition data 24 is conducted in the normal way. Step 44 examines the results of this anti-virus scan. If the scan is failed (e.g. a virus is found), then processing proceeds to step 46 at which a fail result is returned to the operating system 14. Anti-virus response actions are then triggered at step 48, such as file deletion, file quarantining and alert-message generation.

If the test at step 44 indicated that the anti-virus scan was passed, then processing proceeds to step 50 at which the anti-virus software 16 waits for a response from the audit data generator 18. When a response is received from the audit data generator 18, processing proceeds to step 52 at which this response is examined to see if it is a pass or a fail.

If the test at step 52 indicates a pass, then processing proceeds to step 54 at which a pass result is returned to the operating system 14. If the test at step 52 indicated a fail, then processing proceeds to step 56 at which a fail result is returned to the operating system 14.

Figure 5:
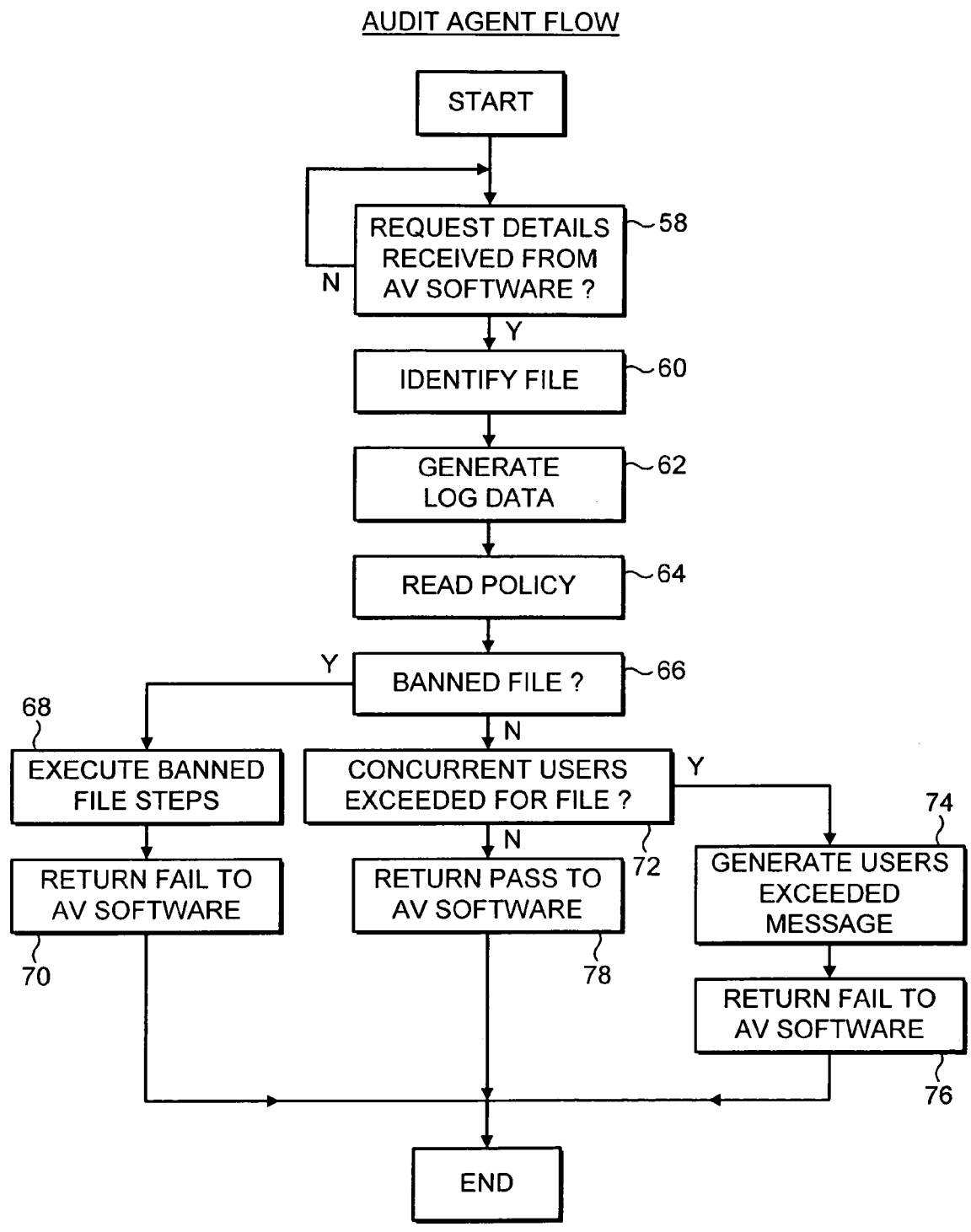
FIG. 5 is a flow diagram schematically illustrating the operation of the audit data generator.

FIG. 5 is a flow diagram illustrating operation of the audit data generator software 18. At step 58, the system waits for details of a computer file access to be received from the anti-virus software 16. When such details are received, then processing proceeds to step 60.

At step 60, the information passed to the audit data generator 18 is compared with a non-user specified list of data characteristic of particular computer programs as well as a user-specified list of such data to identify the particular computer program or file in question. For some data files, no identification may be present. In many cases, identity checks will only be made for executable files. Computer file access requests to certain executable files, or certain DLL files, will be highly characteristic of the use of particular computer programs. As previously discussed, a checksum value for the computer file being accessed may also be calculated at step 60 and compared with a list of known checksum values. This helps guard against people trying to circumvent the audit system by renaming particular program files. The audit data generator software 18 may cache recently calculated checksum values for unchanged computer files to reduce the overhead associated with their calculation.

At step 62, audit log data is generated and either stored locally to be collected later upon polling by a remote computer that generates a consolidated audit report or is immediately sent to that remote computer.

At step 64, the policy data centrally set by the system administrator is read for application to the computer file access request. At step 66, a test is made as to whether or not the computer program being accessed is a banned computer program as indicated in the policy data. If the computer program is banned, then processing proceeds to step 68 at which banned program steps, such as file deletion, file disablement, file encryption and replacement by a stub file and/or generation of an alert message, or any combination of the preceding, are performed. At step 70, a fail message is returned to the anti-virus software 16.

If the test at step 66 did not detect any banned files, then processing proceeds to step 72 where a check is made as whether or not the number of concurrent users for a particular license has been exceeded (different versions of a program may use different files, but all be subject to the same license). The concurrent user check may be made by reference to a central source, such as the server computer 4, which keeps a running total of the number of granted requests to execute that computer file that are currently outstanding. The server computer 4 will also employ a mechanism for detecting when use of that computer program has been terminated by a particular user.

If the number of concurrent users detected at step 72 was exceeded, then step 74 generates a message to the user indicating that access has been denied for this reason and a fail is returned to the anti-virus software 16 at step 76.

If the test at step 72 indicated that the number of concurrent users was not currently exceeded, then processing proceeds to step 78 at which a pass result is returned from the audit data generator 18 to the anti-virus software 16.

It will be appreciated that for the vast majority of file accesses, neither the banned file response nor the excessive concurrent user response will be triggered and processing will proceed via step 78 with a pass result being returned by the audit data generator 18 to the anti-virus software 16.

Figure 6:
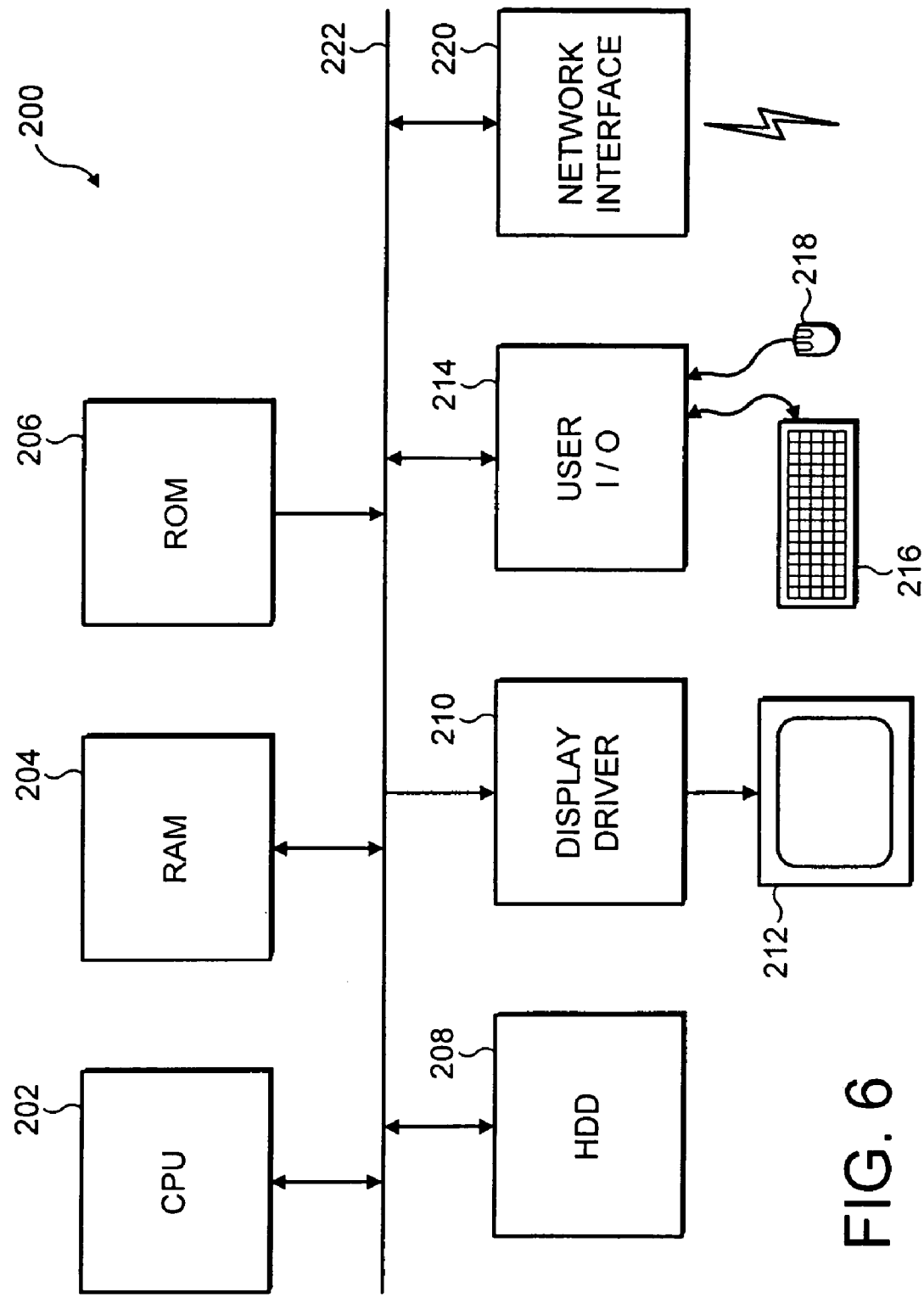
FIG. 6 is a diagram schematically illustrating an example computer hardware arrangement for executing the above described computer programs.

FIG. 6 schematically illustrates a computer 200 of a type that may be used to execute the computer programs described above. The computer 200 includes a central processing unit 202, a random access memory 204, a read-only memory 206, a hard disk drive 208, a display driver 210 and display 212, a user input/output circuit 214, a keyboard 216, a mouse 218 and a network interface circuit 220, all coupled via a common bus 222. In operation, the central processing unit 202 executes computer programs using the random access memory 204 as its working memory. The computer programs may be stored within the read-only memory 206, the hard disk drive 208 or retrieved via the network interface circuit 220 from a remote source. The computer 200 displays the results of its processing activity to the user via the display driver 210 and the display 212. The computer 200 receives control inputs from the user via the user input/output circuit 214, the keyboard 216 and the mouse 218.

The computer program product described above may take the form of a computer program stored within the computer system 200 on the hard disk drive 208, within the random access memory 204, within the read-only memory 206, or downloaded via the network interface circuit 220. The computer program product may also take the form of a recording medium such as a compact disk or floppy disk drive that may be used for distribution purposes. When operating under control of the above described computer program product, the various components of the computer 200 serve to provide the appropriate circuits and logic for carrying out the above described functions and acts. It will be appreciated that the computer 200 illustrated in FIG. 6 is merely one example of a type of computer that may execute the computer program product, method and provide the apparatus described above.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A computer program product comprising a computer program stored on a computer storage medium when executed operable to control a computer to computer to generate audit data indicative of a request to execute a computer program, said computer program comprising:

(i) computer virus scanner logic, responsive to a computer virus scan request including data identifying a computer file to be scanned for computer viruses, for performing a computer virus scan and for generating a scan result;

(ii) audit data generator logic separate from said computer virus scanner logic and being triggered by said computer virus scanner logic prior to said generating said scan result, and responsive to said data identifying said computer file to be scanned that is received from said computer virus scanner logic for simultaneously performing additional operations in parallel with said computer virus scan, said additional operations including identifying a request to execute a computer program associated with said computer file to be scanned for computer viruses by said computer virus scanner logic and, in response to identification of said request to execute said computer program, generating audit data identifying said computer program; wherein said audit data generator logic is responsive to data identifying one or more banned computer programs to identify a request to execute a banned computer program; and (iii) concurrent usage logic for performing a concurrent usage check for identifying a request to execute a further computer program that would result in said further computer program concurrently executing upon more than a predetermined number of computers upon a computer network; wherein said predetermined number varies with time; wherein if said concurrent usage check indicates that said request to execute said further computer program would result in more than said predetermined number of computers upon said computer network concurrently executing said computer program, then said request to execute said further computer program is denied.

2. A computer program product as claimed in claim 1, wherein a file access request to an operating system triggers generation of said computer virus scan request.

3. A computer program product as claimed in claim 1, wherein, it a request to execute a banned computer program is identified, then one or more banned program actions are triggered, said banned program actions including one or more of:

(i) said banned computer program is deleted;
(ii) said banned computer program is disabled;
(iii) said banned program is encrypted and replaced by a stub program; and
(iv) an alert indicating detection of said banned computer program is issued.

4. A computer program product as claimed in claim 1, wherein said data identifying one or more banned computer programs is a permitted computer program list with any computer program not included within said permitted computer program list being a banned computer program.

5. A computer program product as claimed in claim 1, wherein a user message is displayed when execution of said further computer program is prevented.

6. A computer program product as claimed in claim 1, wherein at certain times said predetermined number is zero.

7. A computer program product as claimed in claim 1, wherein said audit data generator logic calculates a checksum value from said computer file, said checksum value being used in identification of said computer file as a particular computer program.

8. A computer program product as claimed in claim 7, wherein said audit data generator logic stores said calculated checksum value and uses said stored calculated checksum values instead of recalculating said checksum value when said computer file subject to a subsequent access without any intervening change having been made to said computer file.

9. A computer program product as claimed in claim 1, wherein said audit data generator logic is responsive to a non-user specified database of data indicative of particular computer programs.

10. A computer program product as claimed in claim 1, wherein said audit data generator logic is responsive to a user specified database of data indicative of particular computer programs.

11. A computer program product as claimed in claim 1, wherein said computer virus scan request results from an on-access scan.

12. A computer program product as claimed in claim 1, wherein said computer virus scan request results from an on-demand scan.

13. A computer program product as claimed in claim 1, wherein local audit data is stored upon a computer within a computer network until said computer is polled by a remote computer upon said computer network whereupon said local audit data is sent to said remote computer.

14. A computer program product as claimed in claim 13, wherein said remote computer generates a consolidated audit report for a plurality of computers upon said computer network.

15. A computer program product as claimed in claim 1, wherein said computer virus scanner logic generates said scan result after receiving a reply from said audit data generator logic.

16. A computer program product as claimed in claim 1, wherein said computer virus scanner logic generates said scan result as a function of a reply from said audit data generator logic.

17. A computer program product as claimed in claim 1, wherein a reply from said audit data generator logic is not used by said computer virus scanner logic if said scan result includes a failure.

18. A computer program product as claimed in claim 1, wherein said data identifying said computer file is sent to said audit data generator logic prior to performing said computer virus scan.

19. A method of generating audit data indicative era request to execute a computer program, said method comprising the steps of:
  (i) responsive to a computer virus scan request within a computer virus scanner, performing a computer virus scan and generating a scan result, said computer virus scan request including data identifying a computer file to be scanned for computer viruses;
  (ii) triggering operation of an audit data, generator which is separate from said computer virus scanner, using said computer virus scanner prior to said generating said scan result, said audit dam generator being responsive to said data identifying said computer file to be scanned that is received from said computer virus scanner for simultaneously performing additional operations in parallel with said computer virus scan, said additional operations including identifying a request to execute a computer program associated with said computer file to be scanned for computer viruses by said computer virus scanner; wherein said audit data generator logic is responsive to data identifying one or more banned computer programs to identify a request to execute a banned computer program; and (iii) in response to identification of said request to execute said computer program, generating audit data identifying said computer program; and
  (iv) performing a concurrent usage check for identifying a request to execute a further computer program that would result in said further computer program concurrently executing upon more than a predetermined number of computers upon computer network; wherein said predetermined number varies with time; wherein if said concurrent usage check indicates that said request to execute said further computer program would result in more than said predetermined number of computers upon said computer network concurrently executing said computer program, then said request to execute said further computer program is denied.

20. A method as claimed in claim 19, wherein a file access request to an operating system triggers generation of said computer virus scan request.

21. A method as claimed in claim 19, wherein, if a request to execute a banned computer program is identified, then one or more banned program actions are triggered, said banned program actions including one or more of:
  (i) said banned computer program is deleted;
  (ii) said banned computer program is disabled;
  (iii) said banned program is encrypted and replaced by a stub program; and
  (iv) an alert indicating detection of said banned computer program is issued.

22. A method as claimed in claim 19, wherein said data identifying one or more banned computer programs is a permitted computer program list with any computer program not included within said permitted computer program list being a banned computer program.

23. A method as claimed in claim 19, wherein a user message is displayed when execution of said further computer program is prevented.

24. A method as claimed in claim 19, wherein at certain times said predetermined number is zero.

25. A method as claimed in claim 19, wherein said audit data generator calculates a checksum value from said computer file, said checksum value being used in identification of said computer file as a particular computer program.

26. A method as claimed in claim 25, wherein said audit data generator stores said calculated checksum value and uses said stored calculated checksum values instead of recalculating said checksum value when said computer file subject to a subsequent access without any intervening change having been made to said computer file.

27. A method as claimed in claim 19, wherein said audit data generator is responsive to a non-user specified database of data indicative of particular computer programs.

28. A method as claimed in claim 19, wherein said audit data generator is responsive to a user specified database of data indicative of particular computer programs.

29. A method as claimed in claim 19, wherein said computer virus scan request results from an on-access scan.

30. A method as claimed in claim 19, wherein said computer virus scan request results from an on-demand scan.

31. A method as claimed in claim 19, wherein local audit data is stored upon a computer within a computer network until said computer is polled by a remote computer upon said computer network whereupon said local audit data is sent to said remote computer.

32. A method as claimed in claim 31, wherein said remote computer generates a consolidated audit report for a plurality of computers upon said computer network.

33. Apparatus for generating audit data indicative of a request to execute a computer prepare, said apparatus comprising:
- (i) a computer virus scanner, responsive to a computer virus scan request, for performing a computer virus scan and for generating a scan result, said computer virus scan request including data identifying a computer file to be scanned for computer viruses;
- (ii) an audit data generator separate from said computer virus scanner and being triggered by said computer virus scanner prior to said generating said scan result, and responsive to said data identifying said computer file to be scanned that is received from said computer virus scanner for simultaneously performing additional operations in parallel with said computer virus scan, said additional operations including identifying a request to execute a computer program associated with said computer file to be scanned for computer viruses by said computer virus scanner and, in response to identification of said request to execute said computer program, generating audit data identifying said computer program; wherein said audit data generator logic is responsive to data identifying one or more banned computer programs to identify a request to execute a banned computer program; and concurrent usage monitor for performing a concurrent usage check for identifying a request to execute a further computer program that would result in said further computer program concurrently executing upon more than a predetermined number of computers upon a computer network; wherein said predetermined number varies with time; wherein if said concurrent usage check indicates that said request to execute said further computer program would result in more than said predetermined number of computers upon said computer network concurrently executing said computer program, then said request to execute said further computer program is denied.

34. Apparatus as claimed in claim 33, wherein a file access request to an operating system triggers generation of said computer virus scan request.

35. Apparatus as claimed in claim 33, wherein, if a request to execute a banned computer program is identified, then one or more banned program actions are triggered, said banned program actions including one or more of:
- (i) said banned computer program is deleted;
- (ii) said banned computer program is disabled;
- (iii) said banned program is encrypted and replaced by a stub program; and
- (iv) an alert indicating detection of said banned computer program is issued.

36. Apparatus as claimed in claim 33, wherein said data identifying one or more banned computer programs is a permitted computer program list with any computer program not included within said permitted computer program list being a banned computer program.

37. Apparatus as claimed in claim 33, wherein a user message is displayed when execution of said further computer program is prevented.

38. Apparatus as claimed in claim 33, wherein at certain times said predetermined number is zero.

39. Apparatus as claimed in claim 33, wherein said audit data generator calculates a checksum value from said computer file, said checksum value being used in identification of said computer file as a particular computer program.

40. Apparatus as claimed in claim 39, wherein said audit data generator stores said calculated checksum value and uses said stored calculated checksum values instead of recalculating said checksum value when said computer file subject to a subsequent access without any intervening change having been made to said computer file.

41. Apparatus as claimed in claim 33, wherein said audit data generator is responsive to a non-user specified database of data indicative of particular computer programs.

42. Apparatus as claimed in claim 33, wherein said audit data generator is responsive to a user specified database of data indicative of particular computer programs.

43. Apparatus as claimed in claim 33, wherein said computer virus scan request results from an on-access scan.

44. Apparatus as claimed in claim 33, wherein said computer virus scan request results from an on-demand scan.

45. Apparatus as claimed in claim 33, wherein local audit data is stored upon a computer within a computer network until said computer is polled by a remote computer upon said computer network whereupon said local audit data is sent to said remote computer.

46. Apparatus as claimed in claim 45, wherein said remote computer generates a consolidated audit report for a plurality of computers upon said computer network.

* * * * *

UNITED STATES PATENT AND TRADEMARK OFFICE
CERTIFICATE OF CORRECTION

PATENT NO. : 7,281,267 B2  
APPLICATION NO. : 09/785222  
DATED : October 9, 2007  
INVENTOR(S) : Tarbotton et al.

Page 1 of 1

It is certified that error appears in the above-identified patent and that said Letters Patent is hereby corrected as shown below:

col. 8, line 32 insert --further-- before "computer" and after "said";
col. 8, line 39 replace "it" with --if--;
col. 9, line 1 replace "tile" with --file--;
col. 9, line 45 replace "ere" with --of a--;
col. 9, line 56 replace "dam" with --data--;
col. 10, line 1 replace "(ii)" with --(iii)--;
col. 10, line 8 insert --a-- before "computer" and after "upon";
col. 11, line 2 replace "prepare" with --program--;
col. 11, line 21 insert --for-- before "generating" and after "program".

Signed and Sealed this

Ninth Day of February, 2010

David J. Kappos
*Director of the United States Patent and Trademark Office*